United States Patent [19]

Brito et al.

[11] Patent Number: 5,205,963
[45] Date of Patent: Apr. 27, 1993

[54] VINYL CHLORIDE PLASTISOL COMPOSITIONS CONTAINING OPTICAL BRIGHTENERS AND PROCESS FOR THEIR PRODUCTION

[75] Inventors: Marquina J. Brito; Ferreira J. Garcia, both of Zaragoza, Spain

[73] Assignee: EMS-TOGO AG, Switzerland

[21] Appl. No.: 909,372

[22] Filed: Jul. 6, 1992

[30] Foreign Application Priority Data

Jul. 12, 1991 [DE] Fed. Rep. of Germany ....... 4123211

[51] Int. Cl.$^5$ .............................................. C09K 11/02
[52] U.S. Cl. ......................... 252/301.35; 252/301.16; 427/158; 521/28; 524/297; 524/472
[58] Field of Search ...................... 252/301.35, 301.16; 427/158; 521/28; 524/297, 472

[56] References Cited

U.S. PATENT DOCUMENTS

| | | | |
|---|---|---|---|
| 3,329,642 | 7/1967 | Lima et al. ........................... | 524/297 |
| 3,874,914 | 4/1975 | Travis ................................... | 524/297 |
| 3,917,550 | 11/1975 | Clas et al. ............................ | 524/297 |
| 4,118,560 | 10/1978 | Weber .................................. | 427/158 |
| 4,151,317 | 4/1979 | Burba et al. ......................... | 524/297 |
| 4,440,900 | 4/1984 | Burba et al. ......................... | 524/297 |
| 4,442,017 | 4/1984 | Blumberg et al. .............. | 252/301.35 |
| 4,533,524 | 8/1985 | Burba ................................... | 524/297 |
| 4,741,860 | 5/1988 | Hartman ........................ | 252/301.35 |
| 4,981,889 | 1/1991 | Baba et al. ............................ | 524/297 |
| 4,988,768 | 1/1991 | Gola et al. ............................ | 524/297 |

*Primary Examiner*—Veronica P. Hoke
*Attorney, Agent, or Firm*—Jordan B. Bierman

[57] ABSTRACT

Yellowing-resistant, overpaintable plastisol compositions based on vinyl chloride homo- or copolymers which contain optical brighteners and, preferably, strongly acid ion exchangers. They are especially suitable for overpaintable sealers, coatings, and adhesives, and find particular application in automobile body construction.

21 Claims, No Drawings

VINYL CHLORIDE PLASTISOL COMPOSITIONS CONTAINING OPTICAL BRIGHTENERS AND PROCESS FOR THEIR PRODUCTION

The invention relates to plastisol compositions, in particular those based on vinyl homo- or co-polymers and containing optical brighteners, their production and use.

BACKGROUND OF THE INVENTION

Plastisols are used widely in auto body construction. The main applications are sealers between panels, bonding of sheets in body and paint shops, and adhesives. They are also used for protection of external areas, such as for undercoating and rocker panel coating.

For this purpose, plastisols based on PVC polymers or PVC copolymers, e.g., as described in DE 31 11 815, are most often used. Such plastisols consist of fine polymer particles dispersed in a nonvolatile plasticizer. At room temperatures, the solid particles are not soluble in the liquid phase, at higher temperatures (the gel temperature), the polymer particles dissolve in the plasticizer. On cooling, the homogeneous solution solidifies to an elastic or rigid film. Normally the plastisols contain additives such as fillers, rheological additives, stabilizers, pigments, solvents, water-absorbing substances, adhesion promoters, etc. The adhesion promoters facilitate adhesion to the surfaces of the respective substrates. Examples of such substrate surfaces are oily steel, galvanized or tinplated steel, electro-coated sheets, aluminum, etc.

Suitable adhesion promoters for sealants or coatings include polyaminoamides, polyamines, epoxy resins, reaction products of polyamines and epoxy resins, blocked isocyanates, organofunctional silanes, mixtures of urotropine and resorcinol, and combinations thereof.

In automotive construction, plastisols or other sealants and coating compounds can be applied to the oily substrates and subsequently degreased, phosphatized, and provided with an electro-dip coating which is baked at temperatures above 150° C. Usually the compounds are applied to surfaces already primed cataphoretically; the jelling or fusing of the plastisols occurs with the baking of the subsequently applied base coats or top coats.

It is often noticed that white, light, or pastel colored finish coats of the vehicle become discolored (yellowish or brownish) at those points where the finish paints are applied on top of the sealing compounds or underbody coatings. Where the finish paints are applied directly on the electrocoat, they yellow much less. Such undesirable discolorations occur regardless of whether the sealing compound was jelled before overpainting or whether the unjelled sealing compound was provided with the finish coat by the wet-on-wet process and baked only thereafter. The yellowish discoloration appears after a period of time, sometimes after only weeks or months. High moisture and elevated temperature accelerate the formation of the discolorations.

The observed discolorations are due, inter alia, to amines which migrate to the surface of the finish coats in small amounts and become transformed by oxidation into colored substances at the surface. These amines may originate from the electrophoretic coating or from the additives. The plasticizers in the sealants assist in the migration of these discoloring substances to the surface. The coats applied over the sealants absorb the plasticizers, leading to flexibilization of the paint and facilitating the diffusion of the dissolved substances. Many of the lacquer systems used today are acid-curing; that is, their crosslinking takes place under the influence of acid catalysts. Sealants and coatings preferably contain chalks or other basic fillers which partially neutralize these acid catalysts. The reduced concentration of the catalysts over the sealants leads to coatings which are less crosslinked. Thus the low crosslinking density also encourages the diffusion of the discoloring substances from the underlying plasticizer-containing materials to the surface.

It has been proposed to bind the unwanted amines by addition of acid substances to the sealant. In DE-PS 38 21 926, acid ion exchangers in powder form are added to the sealant. In DE-OS 38 43 994, the potentially color-giving amines are bound by reaction with tannins which are added to the plastisol. When acid substances are added, however, a part of the adhesion promoters may be absorbed; thus, the adhesion promoters are no longer available for interactions with the surfaces; for example, for the reaction with the electrocoated sheets or with the galvanized steel surfaces.

Finely divided acid ion exchangers are disadvantageous not only for reasons of cost, but also because the fine dust of such powders is extremely irritating to the respiratory tract and may lead to allergic reactions.

SUMMARY OF THE INVENTION

It is the purpose of the present invention to provide improved yellowing-resistant, overpaintable sealing compounds or coatings for vehicle construction, and to reduce the quantity of acid ion exchangers in powder form or to replace them in whole or part with a safe adjuvant pleasant to handle.

The solution to the problems resides in particular sealants or coatings which contain soluble optical brighteners. These migrate from the sealant into the overlying lacquer. There they compensate for the yellow color of the coloring substances, which also migrate from the underlying sealant to the surface. Further, a synergistic combination of acid ion exchangers with the optical brighteners has been found particularly useful.

Optical brighteners, as used herein, are substances which absorb radiation in the ultraviolet part of the spectrum and emit it in the visible longer-wave blue range. The absorbed ultraviolet light is reflected as a faintly bluish fluorescence, that is, as the color complementary to yellow. By this optical effect, the migrating brighteners compensate for the yellowing, in particular that caused by the oxidation products of amines at the lacquer surface.

DETAILED DESCRIPTION OF THE INVENTION

The plastisol composition according to the invention consists of a composition of homo- or copolymers of vinyl chloride, plasticizers, adhesion promoters, fillers, and various other optional additives. The composition contains 0.001% to 0.25%, preferably 0.05% to 0.075%, of optical brighteners and, preferably, strongly acid ion exchangers. (All parts and percentages in the specification and claims are by weight unless otherwise indicated.) The polymers are homopolymers of vinyl chloride, and copolymers of vinyl chloride with vinyl acetate, acrylic acid esters, or methacrylic acid esters wherein the alcohols have up to 8 carbon atoms, preferably 1 to 4 carbon atoms. Mixtures of the homopolymers with copolymers are also useful.

The plastisol compositions according to the invention desirably contain 20% to 60% plasticizers, preferably esters of aliphatic and/or aromatic acids with mono- or bifunctional alcohols which have 1 to 22 carbon atoms. The plastisol may additionally contain secondary plasticizers.

The adhesion promoters are preferably chosen from polyaminoamides, polyamines, epoxy resins, blocked isocyanates, organofunctional silanes, and mixtures of urotropine and resorcinol, as well as combinations thereof. The mineral or organic fillers or pigments are the usual ones, known to the prior art; also, the strongly acid ion exchangers have been described before, e.g. in DE-OL 3, 821, 926.

As optical brighteners, most preferable are derivatives of 4,4'-diaminostilbene,4,4'-distyryl-biphenyl,-methyl umbelliferone, cumarine, dihydroquinolinone, 1,3-diarylpyrazoline, naphthalic acid imide, systems of benzoxazol, benzisoxazol, and benzimidazol which are linked by $CH=CH$ bonds, and pyrene derivatives substituted by heterocycles, all well known in the art. The concentration of the optical brighteners is preferably in the range of 10 to 2500 ppm, especially 50 to 750 ppm, based on the total composition.

In the process for the production of the plastisol composition according to the invention, the optical brighteners can be added to the plastisol at any stage of the production process or even immediately prior to use. To ensure optimum distribution, the optical brighteners can be mixed into the composition as a solution or dispersion in plasticizers or solvents or diluted with fillers. Thus, for example, the dissolution of the optical brightener in the plasticizer occurs in production or before storage, preferably at room temperature or else while jelling at elevated temperature.

The production of plastisols, and the equipment used therefor, is state of the art and is described for example in Krekelen, Wick; Kunststoff Handbuch (Plastics Manual) (1963), Volume 2, Part 1, page 21 ff (W. A. Colomb Verlag, Stuttgart); or Becker, Braun; Kunststoff Handbuch (1968) Volume 2, Parts 1 and 2, (Hanser Verlag, Munich, Vienna).

In a special embodiment of the invention, strongly acid ion exchangers are employed as a 10% to 30% paste with the plasticizers, the proportion of ion exchanger in the total plastisol composition being 0.5% to 3%. Preferably the optical brighteners and the strongly acid ion exchangers are employed as a blend of the ingredients.

The plastisols according to the invention contain, for example, the following components in the quantities stated, a) to e) totaling 100 parts:
 a) 10 to 60 parts of a homopolymer of vinyl chloride, a copolymer of vinyl chloride with vinyl acetate, acrylic acid esters, methacrylic acid esters, other copolymerizable monomers, or mixtures of such polymers produced by emulsion, microsuspension, suspension, solution, or mass polymerization;
 b) 20 to 60 parts of a plasticizer based on esters of aliphatic or aromatic mono- or polycarboxylic acids with mono- or bifunctional alcohols, which optionally contains secondary plasticizers on based on chloroparaffins, hydrocarbons, fatty acid esters, sulfonic acid esters, phosphoric acid esters, and the like;
 c) 1 to 5 parts of adhesion promoters;
 d) 5 to 60 parts of mineral or organic fillers or pigments;
 e) 0 to 5 parts of strongly acid ion exchangers in powder form;
 f) 10 to 2500 ppm, based on the total plastisol, of optical brighteners; and
 g) optionally, further additives such as stabilizers, rheological additives, solvents, etc.

The application of plastisols in automotive construction by extrusion or spraying is known to those active in the field. The plastisols can be overpainted before or after passage through the jelling oven, the lacquer application being possible in multiple layers, for example filler/primer, base coat, top coat, and/or clear coat. The composition and application of these paint systems are also familiar to the person of ordinary skill.

The yellowing tendency of a white or light colored lacquer surface applied over plastisol can be accelerated in the test laboratory, in that the test sheets carrying the overpainted plastisol are stored in the dark at 80° C. in an atmosphere having elevated moisture. Yellowing of a plastisol overpainted with a white color (without the yellowing stabilization according to the invention) can be observed instrumentally after one week, to the eye the color change becomes visible after two weeks. If after 8 weeks storage at 80° C. no difference is visible to the eye, it can be assumed that it is yellowing resistant.

A color or a color change can be determined with the aid of a remission spectrometer. By this method the color impression is characterized in the L,a,b, system (DIN 6174, CIE-LAB 1976). The "b" value indicates the position on the yellow/blue axis and will therefore serve as a measure of the yellow values. Yellow value differences of 0.05 can be determined instrumentally.

In the following, yellowing is indicated as the differences of the "b" values between aged and unaged specimens:

$$\Delta b = \text{yellow value after aging} - \text{yellow value of the freshly baked lacquer}$$

The examples were produced with paste-forming emulsion PVC powder, all additives in powder form had a grain size of less than 80μ. Before application, the plastisols were stored for at least 24 hours. They were applied in layer thicknesses of 0.25 to 2.5 mm on the surface of cataphoretically electro-coated panels which had previously bee baked for 30 minutes at 180° C.

If the plastisol was jelled before overpainting, this was done for 30 minutes at 165° C. If the lacquers were applied before the jelling, that is, in the wet-on-wet process, the jelling of the plastisol was carried out simultaneously with the baking of the lacquer at 135° C. for 30 minutes. But the positive effect of the additions according to the invention was not dependent on whether baking was carried out before or after overpainting.

In the tests, the overpainting took place with an acid-curing, solvent-containing, white cover lacquer based on acrylic and alkyd resins crosslinked with melamine in a layer thickness of 40–50μ.

| Test number | EXAMPLES: | | | | |
|---|---|---|---|---|---|
| | *00 | 01 | 02 | 03 | 04 |
| 1. PVC homopolymer | — | 8 | 8 | 8 | 8 |
| 2. PVC copolymer | — | 5 | 5 | 5 | 5 |
| 3. Plasticizer (DINP) | — | 28 | 28 | 28 | 28 |
| 4. Polyaminoamide | — | 2 | 2 | 2 | 2 |

-continued

| | | | | | |
|---|---|---|---|---|---|
| 5. Ground chalk | — | 39 | 39 | 39 | 39 |
| 6. Precipitated chalk, surface-treated | — | 13 | 13 | 13 | 13 |
| 7. Titanium dioxide | — | 2 | 2 | 2 | 2 |
| 8. Calcium oxide, pulverized | — | 3 | 3 | 3 | 3 |
| 9. Strongly acid ion exchanger in powder form, 20% in DINP | — | — | — | — | — |
| Subtotal, parts by weight | — | 100 | 100 | 100 | 100 |
| 10. Optical brighteners in ppm | | | | | |
| -UVITEX OB (CIBA-GEIGY AG) | — | — | 300 | 600 | 1000 |
| -LEUCOPUR EGM (SANDOZ AG) | — | — | — | — | — |
| Results: Δb after aging | | | | | |
| Freshly baked, room temp. | 0.0 | 1.0 | 0.0 | −0.8 | −1.5 |
| After 2 weeks at 80° C. | 0.9 | 1.8 | 1.0 | 0.1 | −0.3 |
| After 4 weeks at 80° C. | 1.6 | 2.4 | 1.6 | 0.9 | 0.4 |
| After 8 weeks at 80° C. | 2.6 | 3.0 | 2.2 | 1.4 | 1.1 |

Remarks:
2. with 5% vinyl acetate
3. DINP = Diisononyl phthalate
4. Reaction product of dimerized linseed oil fatty acid with an excess of diethylene triamine, amine number 290, 50% solution in plasticizer
11. Strongly acid cation exchanger in the H form, 4.4 mVal/g, max. grain size 40 mμ 20% dispersion in plasticizer
*Blank: freshly baked lacquer on cataphoresis sheet

| | EXAMPLES: | | | |
|---|---|---|---|---|
| Test number | 05 | 06 | 07 | 08 |
| 1. PVC homopolymer | 8 | 8 | 8 | 8 |
| 2. PVC copolymer | 5 | 5 | 5 | 5 |
| 3. Plasticizer (DINP) | 26 | 27 | 27 | 28 |
| 4. Polyaminoamide | 2 | 2 | 2 | 2 |
| 5. Ground chalk | 38 | 38 | 39 | 39 |
| 6. Precipitated chalk, surface-treated | 13 | 13 | 13 | 13 |
| 7. Titanium dioxide | 2 | 2 | 2 | 2 |
| 8. Calcium oxide, pulverized | 3 | 3 | 3 | 3 |
| 9. Strongly acid ion exchanger | 3 | 2 | 1 | — |
| Subtotal, parts by weight | 100 | 100 | 100 | 100 |
| 10. Optical brighteners in ppm | | | | |
| -UVITEX OB (CIBA-GEIGY AG) | — | — | — | — |
| -LEUCOPUR EGM (SANDOZ AG) | — | 150 | 300 | 300 |
| Results: Δb after aging | | | | |
| Freshly baked, room temp. | 0.35 | −1.0 | −0.45 | −0.75 |
| After 2 weeks at 80° C. | 1.35 | 0.8 | 0.25 | 0.9 |
| After 4 weeks at 80° C. | 1.6 | 1.2 | 0.95 | 1.55 |
| After 8 weeks at 80° C. | 2.3 | 1.95 | 1.65 | 2.10 |

Remarks:
2. with 5% vinyl acetate
4. Reaction product of dimerized linseed oil fatty acid with an excess of diethylene triamine, amine number 290, 50% solution in plasticizer
11. Strongly acid cation exchanger in the H form, 4.4 mVal/g, max. grain size 40 mμ 20% dispersion in plasticizer

What we claim is:

1. A plastisol composition comprising homo- and/or copolymers of vinyl chloride, said composition further including 0.001% to 0.25% of at least one optical brightener.

2. The composition of claim 1 comprising at least one strongly acid ion exchanger.

3. A plastisol composition comprising
   a) 10 to 60 parts of vinyl chloride polymers,
   b) 20 to 60 parts of at least one plasticizer,
   c) 1 to 5 parts of an adhesion promotor,
   d) 5 to 60 parts of at least one additive selected from the group consisting of mineral fillers, organic fillers, pigments, and mixtures thereof,
   e) 0 to 5 parts of strongly acid ion exchanger, a) to e) totaling 100 parts,
   f) 10 to 2500 ppm, based on a) to e), of at least one optical brightener.

4. The plastisol composition of claim 3 wherein said vinyl chloride polymers are selected from the group consistent of homopolymers of vinyl chloride, copolymers of vinyl chloride with vinyl acetate, and mixtures of said homopolymers and copolymers.

5. The plastisol composition of claim 3 wherein said vinyl chloride polymer comprises copolymers of vinyl chloride with a maximum of 20 mol % of acrylic acid esters, methacrylic acid esters, and mixtures thereof.

6. The plastisol composition of claim 5 wherein said acrylic esters and said methacrylic esters are of alcohols having up to 8 carbon atoms.

7. The plastisol composition of claim 6 wherein said alcohols have 1 to 4 carbon atoms.

8. The plastisol composition of claim 1 wherein said plasticizer is selected from the group consisting of esters of aliphatic and/or aromatic acids with mono- or bifunctional alcohol having 1 to 22 carbon atoms.

9. The plastisol composition of claim 3 wherein said plasticizer is selected from the group consisting of esters of aliphatic and/or aromatic acids with mono- or bifunctional alcohols having 1 to 22 carbon atoms.

10. The plastisol composition of claim 3 wherein a secondary plasticizer is also present.

11. The plastisol composition of claim 3 wherein said primer is selected from the group consisting of polyaminoamides, polyamines, epoxy resins, blocked isocyanates, organofunctional silanes, blends of urotropine and resorcinol, and mixtures thereof.

12. The plastisol composition of claim 1 wherein said optical brightener is selected from the group consisting of derivatives of 4,4'-diaminostilbene; 4,4'-distyrylbiphenyl; methyl umbelliferone; cumarine; dihydroquinolinone; 1,3-diarylpyrazolines; naphthalic acid imide; systems of benzoxazol, benzisoxazol, and benzimidazol; heterocyclicly substituted pyrene derivatives; and mixtures thereof.

13. The plastisol composition of claim 3 wherein said optical brightener is selected from the group consisting of derivatives of 4,4'-diaminostilbene; 4,4'-distyrylbiphenyl; methyl umbelliferone; cumarine; dihydroquinolinone; 1,3-diarylpyrazolines; naphthalic acid imide; systems of benzoxazol, benzisoxazol, benzimidazol; heterocyclicly substituted pyrene derivatives; and mixtures thereof.

14. The plastisol composition of claim 1 wherein there is 0.005% to 0.075% of said optical brightener present.

15. A process for the production of the plastisol compositions of claim 1 comprising adding 10 to 2500 ppm, based on said composition, of at least one optical brightener to a mixture comprising vinyl chloride polymers, plasticizers, primers, and fillers.

16. The process of claim 15 wherein 50 to 750 ppm of said brighteners are present.

17. The process of claim 15 wherein at least one strongly acid ion exchanger is present.

18. The plastisol composition of claim 1 wherein said ion exchanger and said plasticizer are in the form of a paste.

19. The plastisol composition of claim 1 wherein said brightener has been added to said composition shortly prior to use.

20. The method of claim 15 wherein said ion exchanger and said plasticizer are in the form of a paste.

21. The method of claim 15 further comprising adding said brightener to said mixture immediately prior to use.

* * * * *